US012150565B2

(12) United States Patent
Grimm

(10) Patent No.: US 12,150,565 B2
(45) Date of Patent: Nov. 26, 2024

(54) WIND DEFLECTOR

(71) Applicant: David Grimm, West Des Moines, IA (US)

(72) Inventor: David Grimm, West Des Moines, IA (US)

( * ) Notice: Subject to any disclaimer, the term of this patent is extended or adjusted under 35 U.S.C. 154(b) by 632 days.

(21) Appl. No.: 17/230,495

(22) Filed: Apr. 14, 2021

(65) Prior Publication Data

US 2022/0330727 A1 Oct. 20, 2022

(51) Int. Cl.

*E06B 9/04* (2006.01)
*A47F 10/06* (2006.01)
*E06B 7/26* (2006.01)
*E06B 9/02* (2006.01)
*A47F 3/00* (2006.01)
*E06B 3/40* (2006.01)

(52) U.S. Cl.

CPC ................ *A47F 10/06* (2013.01); *E06B 7/26* (2013.01); *A47F 2003/008* (2013.01); *E06B 2003/403* (2013.01); *E06B 9/02* (2013.01); *E06B 9/04* (2013.01)

(58) Field of Classification Search

CPC ............... A47F 10/06; E06B 7/26; E06B 9/04
See application file for complete search history.

(56) References Cited

U.S. PATENT DOCUMENTS 769,868 A * 9/1904 Thiel ......................... G09F 7/20 248/592
1,238,294 A * 8/1917 Ali .......................... E06B 9/165 160/222
1,465,722 A * 8/1923 Thomas .................... E06B 7/26 454/220
1,586,089 A * 5/1926 Krewson ................... E06B 7/26 454/220
1,684,418 A * 9/1928 Simmons ............... B60J 3/0204 248/286.1
2,430,059 A * 11/1947 Krantz .................. E06B 3/2605 49/63
2,458,125 A * 1/1949 Winkler ................. B60J 3/0208 296/97.2
2,548,250 A * 4/1951 Allen ..................... B61D 25/00 49/141
2,805,711 A * 9/1957 Mehl ....................... E04H 15/08 160/76
2,808,774 A * 10/1957 Camerino ................. E06B 7/26 454/213
2,818,298 A * 12/1957 Goeske .................. B60J 3/0208 160/DIG. 3
2,941,839 A * 6/1960 Pendlebury ............ B60J 3/0208 296/97.6

(Continued)

FOREIGN PATENT DOCUMENTS

KR 101486191 B1 * 1/2015

*Primary Examiner* — Phi D A
(74) *Attorney, Agent, or Firm* — ZarleyConley PLC

(57) ABSTRACT

The disclosure provided herein is directed to a wind deflector that provides a lift and subsequent deflection of naturally occurring wind. The wind deflector has a shield assembly that is connected to a mount assembly. The mount assembly is configured to be biased to a closed position that holds the shield assembly at a desired angle of deflection and to break away when physical force is applied against the bias of the mount assembly.

20 Claims, 4 Drawing Sheets

(56) References Cited

U.S. PATENT DOCUMENTS

| | | | | | |
|---|---|---|---|---|---|
| 3,099,950 | A * | 8/1963 | Christian | E06B 7/26 454/220 |
| 4,184,295 | A * | 1/1980 | Hicks | E04F 10/00 52/64 |
| 4,426,797 | A * | 1/1984 | Burkemper | G09F 3/20 40/584 |
| 4,466,592 | A * | 8/1984 | Janson | A47F 10/06 248/225.11 |
| 4,901,969 | A * | 2/1990 | Yaeger | A47B 23/02 248/455 |
| 5,216,839 | A * | 6/1993 | Woodruff | E06B 5/003 49/495.1 |
| 5,289,652 | A * | 3/1994 | Kringel | G09F 3/204 40/651 |
| 5,613,725 | A * | 3/1997 | Lozano | B60J 3/0208 296/97.6 |
| D387,922 | S * | 12/1997 | Dormon | D8/382 |
| 5,722,628 | A * | 3/1998 | Menaged | A47B 23/043 248/455 |
| 5,924,367 | A * | 7/1999 | Henke | A47F 5/0087 108/108 |
| 6,044,982 | A * | 4/2000 | Stuart | F16M 13/022 248/231.71 |
| 6,202,334 | B1 * | 3/2001 | Reynolds | G09F 7/22 40/608 |
| 6,435,466 | B1 * | 8/2002 | Adams | A47B 23/044 248/455 |
| 6,471,164 | B2 * | 10/2002 | DiOrio | A47B 21/0314 248/118.1 |
| 7,216,445 | B2 * | 5/2007 | Bruegmann | G09F 3/204 40/606.15 |
| 8,136,459 | B2 * | 3/2012 | Buckland | A47B 13/10 108/69 |
| 8,307,513 | B1 * | 11/2012 | Fitzgerald | E05D 11/06 16/386 |
| 9,334,685 | B1 * | 5/2016 | DeMoore | E06B 7/03 |
| 9,353,529 | B2 * | 5/2016 | Richmeier | E04F 10/02 |
| 2004/0040230 | A1 * | 3/2004 | Taegar | E06B 9/04 52/506.05 |
| 2006/0026877 | A1 * | 2/2006 | Dicke | G09F 15/0056 40/607.1 |
| 2007/0145871 | A1 * | 6/2007 | Christie | E05D 3/022 312/329 |
| 2010/0126051 | A1 * | 5/2010 | Kerton | G09F 7/18 40/607.13 |
| 2011/0080075 | A1 * | 4/2011 | Matus, Jr. | A47F 10/06 312/140.4 |
| 2020/0370370 | A1 * | 11/2020 | Satrom | E06B 9/04 |

* cited by examiner

WIND DEFLECTOR

BACKGROUND OF THE INVENTION

This invention is directed towards a wind deflector. More specifically, and without limitation, this invention relates to a wind deflector for deflecting wind adjacent a drive-thru window.

Devices that deflect wind from areas such as retail location entrances and drive-thru windows are known in the art.

Wind is a significant issue in restaurant services sector and particularly with respect to services rendered using a drive-thru window. Wind causes a host of problems with the most prominent being the cooling of food that is intended to be served hot or at least warm. As wind passes over food, especially cold winds associated with the early spring, fall, and winter seasons, the temperature of the food decreases and often at a rapid pace. This in turn leads to food safety issues related to consuming food at unsafe temperatures and general dissatisfaction from patrons who expected a warm meal or snack.

When patrons are unhappy with their food another set of problems arise. The most immediate is the patron's dissatisfaction with the food, which leads to reduce spending during the visit and a drop-off in the likelihood that the patron will be a recurring visitor to the restaurant. It is well known that dissatisfied patrons are more likely to leave a poor review of an establishment, which is difficult to counteract given the difficulty in obtaining positive reviews.

In addition to harming a restaurant's customer base, unhappy patrons also damage employee morale as employees often face the brunt of a patron's malcontent. Employees who are repeatedly subjected to negative patron experiences are less likely to stay at their place of employment. In addition, employees working in a location exposed to winds, such as the cockpit of a drive-thru window, have a lower job satisfaction due to wind, which makes employees cold, dishevels employee hair and uniforms, inhibits transactions such as the passing of payment and receipts, and can push orders off countertops. When an employee leaves, the restaurant is not only harmed by the loss in experience in training but also the time and expense involved in securing a new competent employee and providing that new employee with training and experience.

Air curtains are one attempt to address the problems caused by natural wind. These devices operate, most commonly, with a blower fan mounted over an entrance such as a door or window. The blower fan provides a continuous broad stream of air that is circulated across the opening. This stream of air moves with a velocity and angle that attempts to entrain any air, dust, insects, or debris crossing the path of the stream of air. Unfortunately, wind curtains have their own host of problems.

According to the American Society of Heating, Refrigerating and Air Conditioning Engineers estimates that air curtains effectiveness in preventing infiltration falls between 60 to 80%. A considerable amount of infiltration occurs, especially when the continuous nature of wind is considered—especially Northern winds.

In addition, the cost for such devices is substantial. Beyond the cost of the device itself, the air curtain must be installed, usually by a hired professional, and then operated by way of an electrical or gas connection. In certain situations, the presence of an air curtain requires substantial modification to a structure in order for mounting and proper operation.

During operation of some models of air curtains, the air blower is loud and diminishes the ability to hear a patron's order, which in some instances is already hampered due to environmental conditions, car noise, and other forms of air pollution occurring within the cockpit of the drive-thru and the ordering interface used by patrons. When patron orders are not clearly understood, orders are entered inaccurately and patrons are dissatisfied with their incorrect order. In extreme situations, the inability to understand a patron's order can have very harmful results, e.g., when food allergies are involved.

Employee satisfaction not only suffers as patron dissatisfaction rises as a result of air curtains, but the air curtain's operation can also directly harm the morale of employees. Like the wind, air curtains contribute to an employee and the employee's work area being disheveled as a continuous flow of forced air is forced down upon them and the cockpit in which they stand, which can include a variety of key operational equipment such as a cash register, drink dispensing machine, and the like.

Air curtains in some ways contribute to or even enhance the harms caused by wind as the primary function of air curtains is to prevent entry through the air curtain of various types of debris. In a drive-thru setting, the air curtain must be breached multiple times during a transaction. When payment is collected, the air curtain is forcing air against the means of payment, which can cause paper currency, coins, and credit and debit cards to be dropped when passed between patrons and employees. This is not only troublesome, but can lead to payments being lost and stuck under a vehicle, with the latter scenario being arduous and dangerous as the patron must exit the vehicle in close proximity to a building and attempt to retrieve their payment. While payment is being passed to the employee, the employee or patron encounter the air curtain that is forcing dust, debris, bacteria, etc. down upon the extremities of either the employee, patron, or both, as well as the payment. When payment is complete, the process is repeated as a receipt is provided back to the patron along with any excess payment or return of a credit or debit card. Receipts are very susceptible to being dislodged and floating away due to the length of a receipt and the light weight paper used. When receipts are blown away they often become litter that accumulates near the establishment, which diminishes the aesthetic and curb appeal of the business to potential patrons thus leading to a decline in patronage and revenue.

Most significantly, air curtains blow air down on a food order as it is being passed to the patron. As a result, forceful air easily passes through any opening in the container holding the food thereby exposing the meal to dust, debris, bacteria, insects, etc., which is unsanitary. Meanwhile, the air is also cooling the food, which as described, causes a host of issues with a patron's experience. Even if the container is sealed, the passage of air on the exterior of the container contributes to heat loss of the food. Accordingly, while an air curtain has many benefits, many of its deficiencies exasperate the harms caused by wind.

Thus it is a primary objective of this invention to provide a wind deflector that improves upon the art.

Another objective of this invention is to provide a wind deflector that increases patron satisfaction and retention.

Yet another objective of this invention is to provide a wind deflector that increases employee satisfaction and retention.

Another objective of this invention is to provide a wind deflector that does not require energy or power to operate.

Yet another objective of this invention is to provide a wind deflector that is easy to assembly and install.

Another objective of this invention is to provide a wind deflector that is unobtrusive.

Yet another objective of this invention is to provide a wind deflector that limits or prevents damage to a vehicle if engaged or struck.

Another objective of this invention is to provide a wind deflector that is cost effective.

Yet another objective of this invention is to provide a wind deflector that increases return on investment.

Another objective of this invention is to provide a wind deflector that maintains food temperatures.

Yet another objective of this invention is to provide a wind deflector that sustains or improves taste scores.

Another objective of this invention is to provide a wind deflector that is safe to operate.

These and other objectives, features, and advantages of the invention will become apparent from the specification and claims.

SUMMARY OF THE INVENTION

The disclosure provides various aspects of a wind deflector that provides lift to naturally occurring wind so that the wind is deflected away from where the wind deflector is connected, such as adjacent a drive-thru window. The disclosure reduces or eliminates the harms caused by wind, including issues that occur at drive-thru window, including the cooling of food, dissatisfied consumers, dissatisfied employees, and diminished return on investment. The disclosure provides a solution that is easy to use and does not require energy or power to be consumed.

In one aspect of the disclosure, broadly described herein, a wind deflector is disclosed that comprises a shield assembly that is connected to a mount assembly. The shield assembly that includes a shield and in some aspects a skirt assembly that occupies the space immediately adjacent any gap formed between the surface on which the wind deflector is mounted and the shield. The mount assembly is configured to have a bias that statically holds the shield assembly at a desired angle of deflection. The bias of the mount assembly can be overcome by way of physical force being applied to the shield assembly that opposes the bias, such as by way of being engaged by a vehicle approaching the drive-thru window or upon a vehicle departing away from the drive-thru window. The break away feature of the wind deflector prevents harm to a vehicle should contact be made between a vehicle and the wind deflector In one aspect of the disclosure, broadly described herein, the desired angle of deflection is accomplished by way of a stop that is connected to the hinge and is positioned between a first plate and a second plate of the hinge. The bias of the hinge applies a force toward a closed position that is limited by the presence of the stop so that the first plate and second plate cannot come into flush contact with one another. As a result, the bias of the hinge closes the first plate and the second plate at an angle that is more than zero degrees and which matches the desired angle of deflection.

In one aspect of the disclosure, broadly described herein, the mount assembly has a mount member that is positioned between the shield assembly and the surface on which the wind deflector is installed. The mount member provides the unique advantage of providing additional space about which the mount assembly and shield assembly can rotate while also reducing the wear caused to the wind deflector and the surface on which the wind deflector is installed.

This has outlined, rather broadly, the features, advantages, solutions, and benefits of the disclosure in order that the description that follows may be better understood. Additional features, advantages, solutions, and benefits of the disclosure will be described in the following. It should be appreciated by those skilled in the art that this disclosure may be readily utilized as a basis for modifying or designing other structures and related operations for carrying out the same purposes of the present disclosure. It should also be realized by those skilled in the art that such equivalent constructions and related operation do not depart from the teachings of the disclosure as set forth in the appended claims. The novel features, together with further objects and advantages, will be better understood from the following description when considered in connection with the accompanying Figures. It is to be expressly understood, however, that each of the Figures is provided for the purpose of illustration and description only and is not intended as a definition of the limits of the present disclosure.

DETAILED DESCRIPTION

Figure 1:
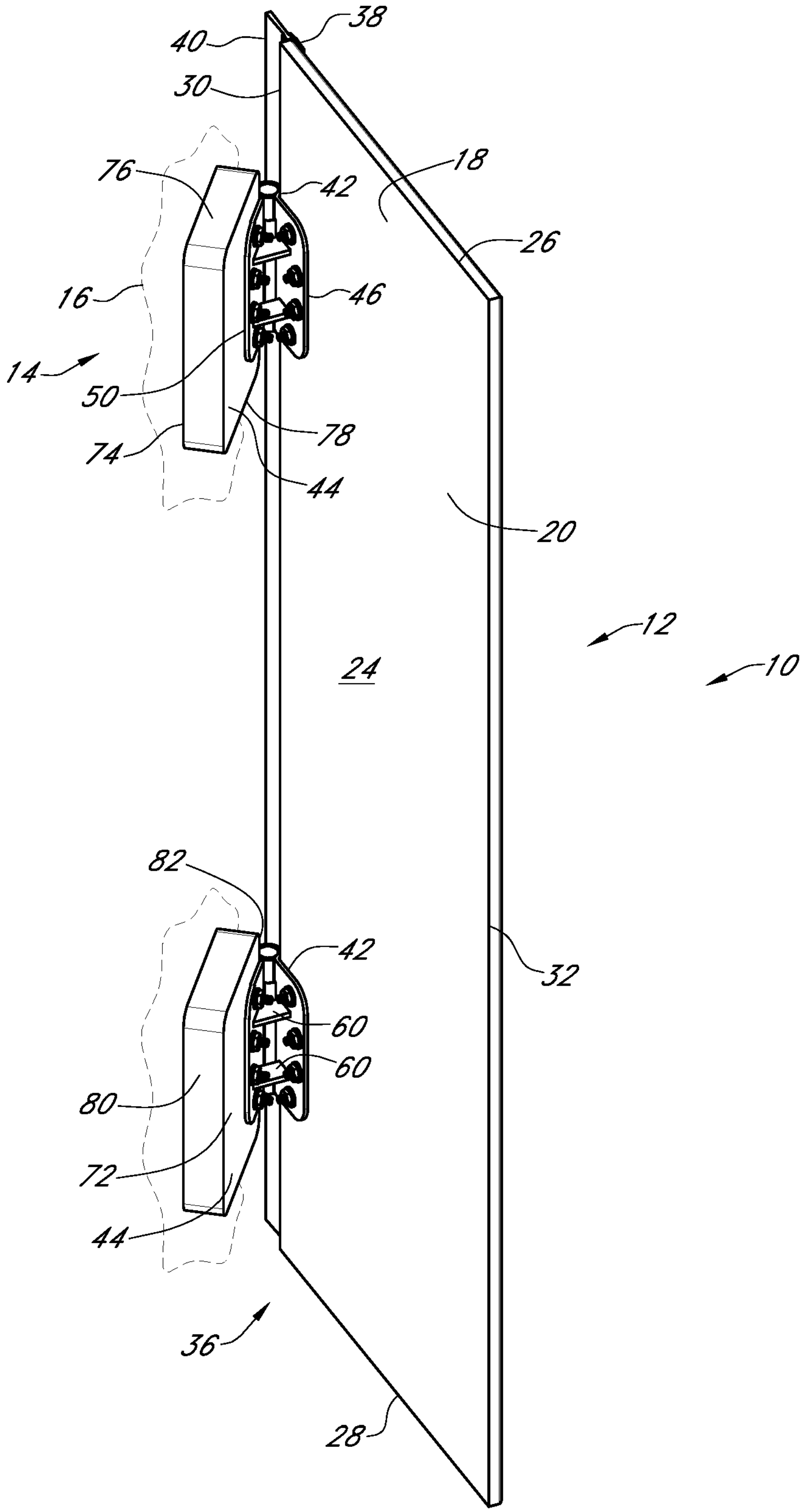
FIG. 1 is a rear perspective view of a wind deflector according to an aspect of the disclosure.
Figure 2:
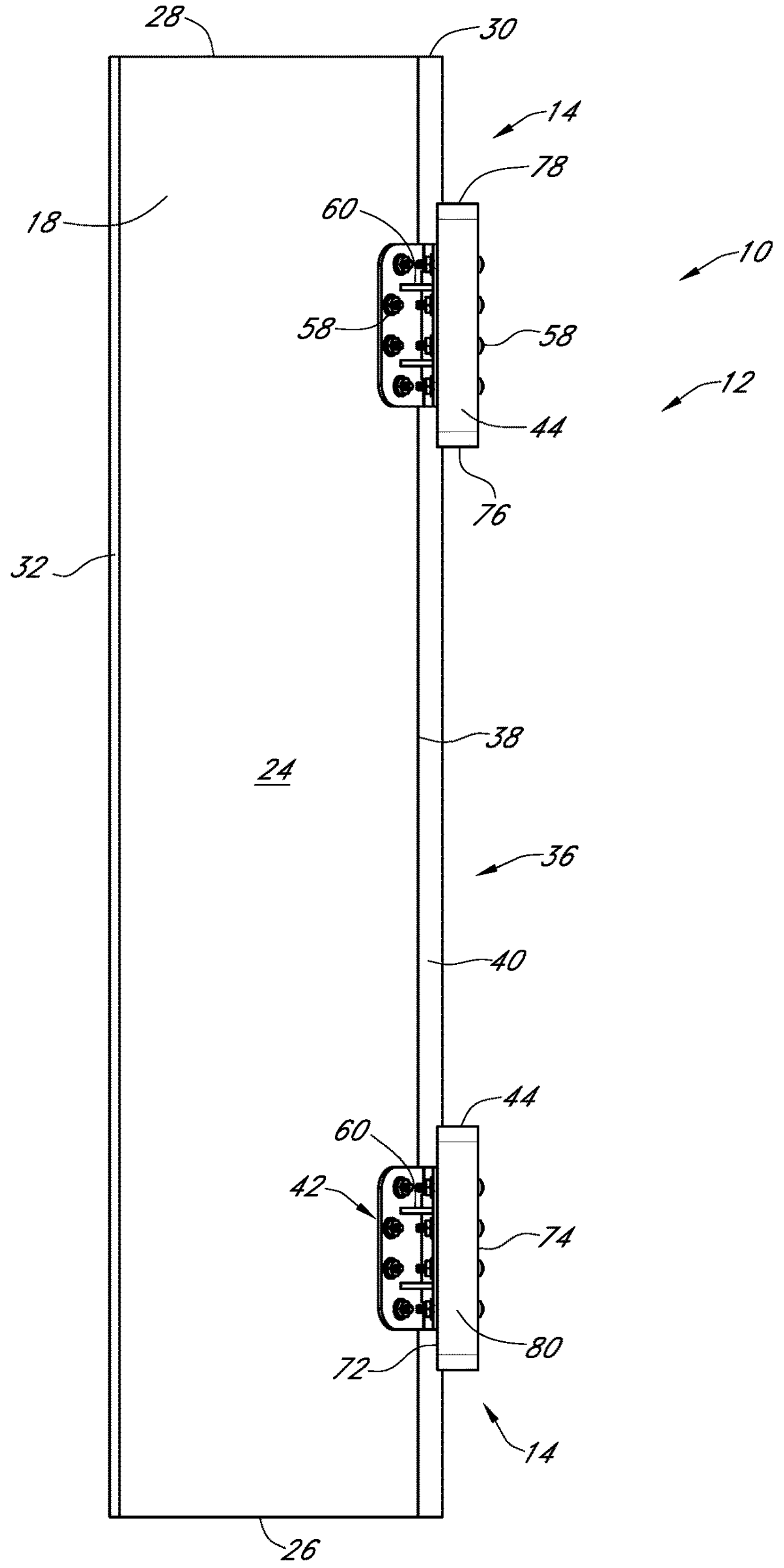
FIG. 2 is a rear view of a wind deflector according to an aspect of the disclosure.
Figure 3:
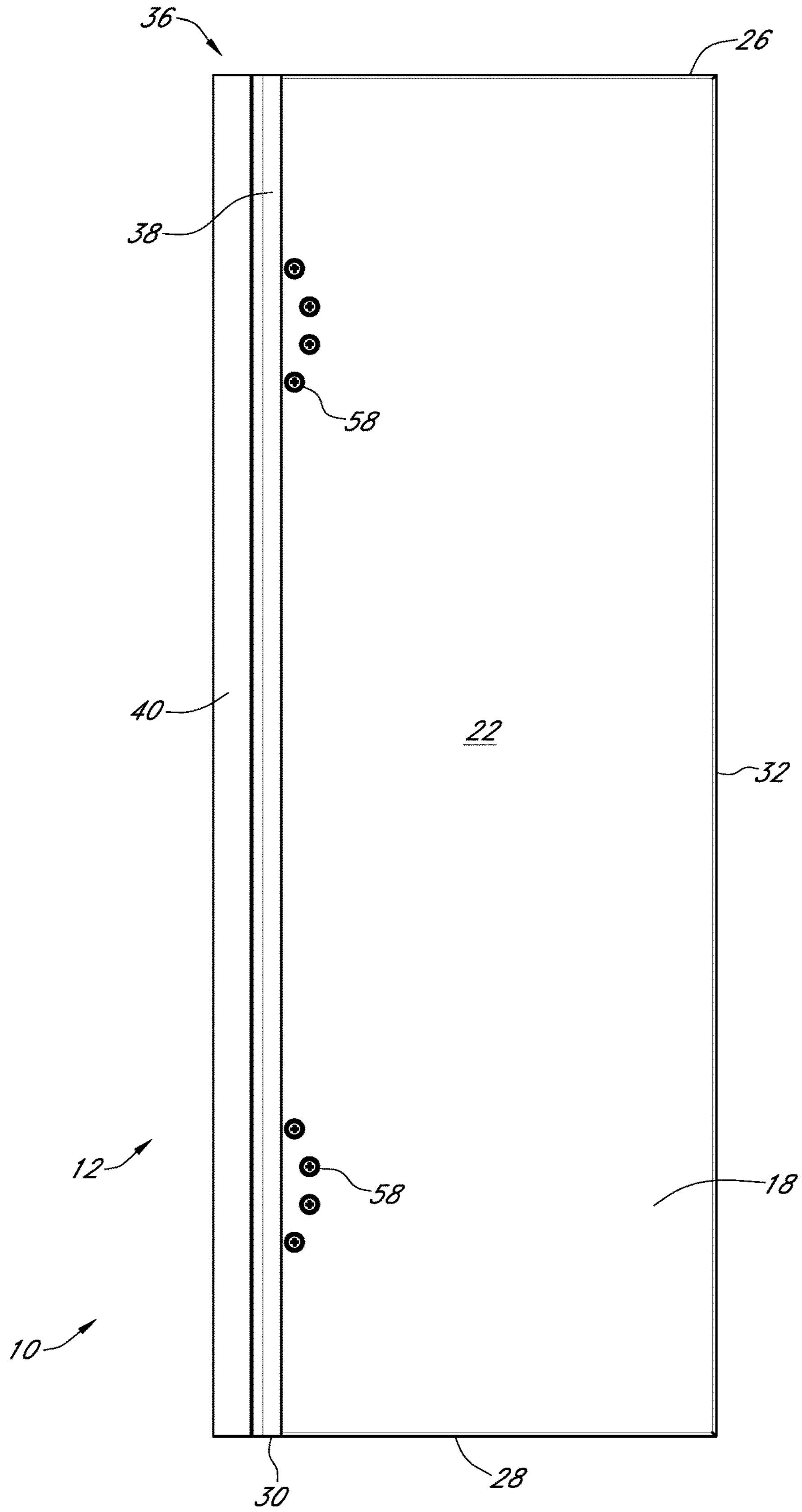
FIG. 3 is a front view of a wind deflector according to an aspect of the disclosure.
Figure 4:
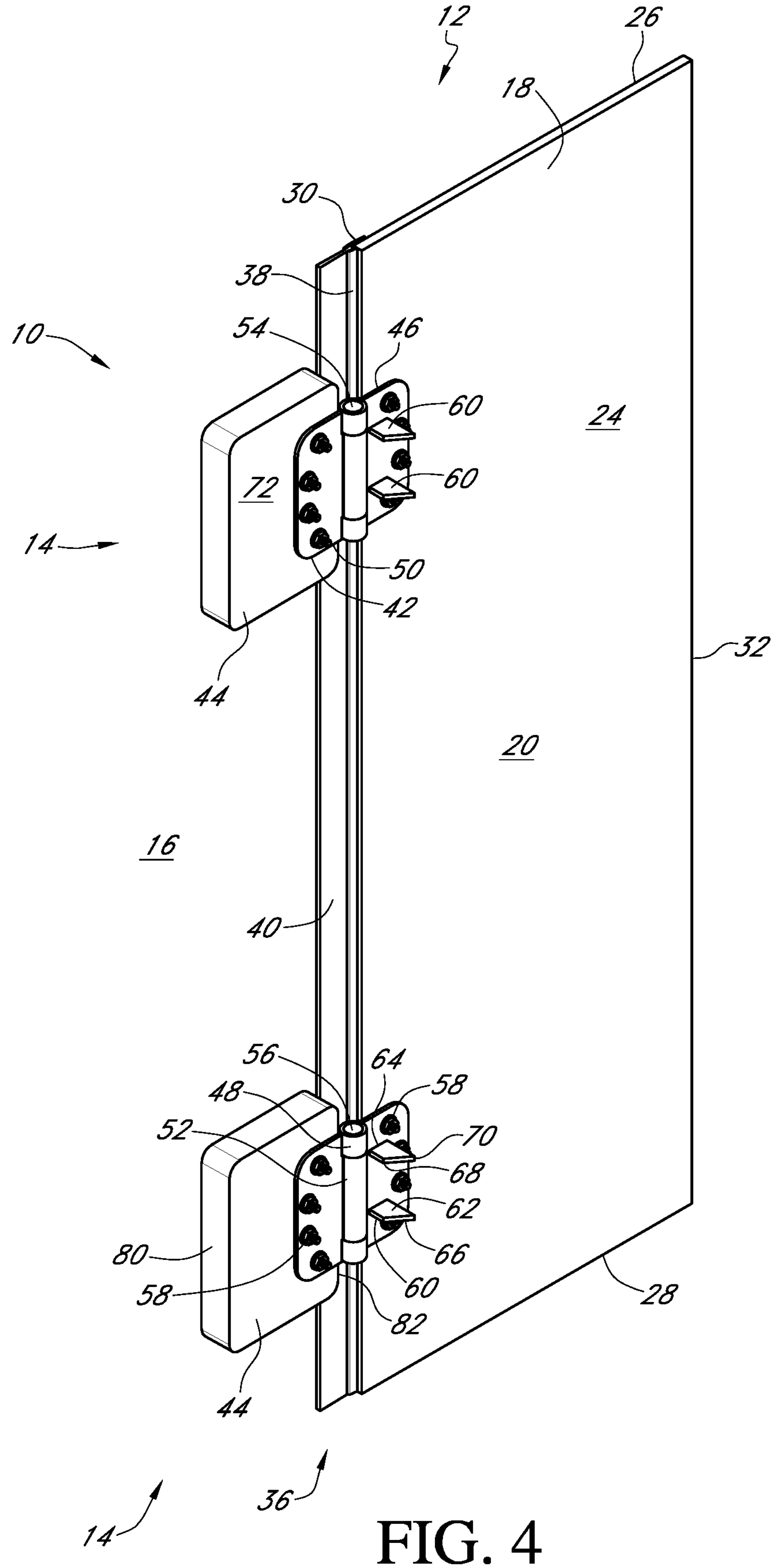
FIG. 4 is a rear perspective view of a wind deflector according to an aspect of the disclosure.

The disclosure described herein is directed to different aspects of a wind deflector. The detailed description set forth below, in connection with the appended drawings, is intended as a description of various configurations and is not intended to represent the only configurations in which the concepts described herein may be practiced. These descriptions include specific details for the purpose of providing a thorough understanding of the various concepts. It will be apparent, however, to those skilled in the art that these concepts may be practiced without these specific details. In some instances, well-known structures and components are shown in block diagram form in order to avoid obscuring such concepts. As described herein, the use of the term "and/or" is intended to represent an "inclusive OR", and the use of the term "or" is intended to represent an "exclusive OR".

The disclosure is described herein with reference to certain aspects, iterations, embodiments, and examples but it is understood that the disclosure can be embodied in many different forms and should not be construed as limited to the aspects set forth herein. In particular, the disclosure is described herein in regards to a wind deflector 10 used in a drive-thru environment, but it is understood that the disclosure can be implemented in a variety of locations and environments.

Although the terms first, second, etc. may be used herein to describe various elements or components, these elements or components should not be limited by these terms. These terms are only used to distinguish one element or component from another. Hence, a first element discussed herein could be termed a second element without departing from the teachings of the present application. It is understood that actual systems or fixtures embodying the disclosure can be arranged in many different ways with many more features and elements beyond what is shown in the drawings. For the same or similar elements or features, the same reference numbers may be used throughout the disclosure.

It is to be understood that when an element or component is referred to as being "on" another element or component, it can be directly on the other element or intervening elements may also be present. Furthermore, relative terms such as "between", "within", "below", and similar terms, may be used herein to describe a relationship of one element or component to another. It is understood that these terms are intended to encompass different orientations of the disclosure in addition to the orientation depicted in the figures.

Aspects of the disclosure may be described herein with reference to illustrations that are schematic illustrations. As such, the actual thickness of elements can be different, and variations from the shapes of the illustrations as a result, for example, of manufacturing techniques and/or tolerances are expected. Thus, the elements illustrated in the figures are schematic in nature and their shapes are not intended to illustrate the precise shape of a region of a device and are not intended to limit the scope of the disclosure unless specific aspects or embodiments are indicated.

With reference to the Figures aspects of a wind deflector 10 are shown according to the disclosure. The wind deflector comprises a shield assembly 12 connected to a mount assembly 14 that is configured to maintain the shield assembly 12 an angle in relation to a surface 16, such as an exterior wall of a building, to deflect wind and break away if and when engaged by a vehicle, person, or similar object.

The shield assembly 12 comprises a shield 18 that in some aspects has a generally planar rectangular shape with a body 20 with a first or front surface 22 and a second or rear surface 24 that extend between a top terminal end or edge 26, a bottom terminal end or edge 28, a first side terminal end or edge 30, and a second side terminal end or edge 32. In particular aspects, the body 20 extends 36 inches by 12 inches. At 36 inches, the size of the shield 18 provides the unique benefit of being configured to extend above and below the standard height of a drive-thru window 34 (not shown), which provides the unique benefit of deflecting wind along the entire height of the drive-thru window 34 as well as an additional distance beyond the drive-thru window 34 as described further herein, thereby further providing for superior deflection, patron experience, and employee experience. At dimensions less than 34 inches tall, the shield 18 will not extend the height of the standard drive-thru window 34, which would lead to wind entering the drive-thru window 34 without deflection. With a length of 12 inches, the shield 18 provides sufficient lift and thus deflection as described further herein without inhibiting a patron from getting close to the drive-thru window 34 to permit an easy exchange of payment and order. In one aspect, the shield 18 is made of acrylonitrile-butadiene-styrene (ABS) plastic, which provides the unique benefit of being durable in both extremely hot and cold environments and resisting fracture or breakage upon impact such as could occur with being struck by a vehicle or the release of the break away as described herein.

In some embodiments, the shield assembly 12 has a skirt or sweep assembly 36 connected to and along the entirety of the first side edge 30 to seal or partially seal a gap between the first side edge 30 of the shield 18 and the surface 16 on which the shield assembly 12 is mounted while remaining flexible to bend during break away. In other embodiments, the skirt assembly 36 extends only along a portion of the first side edge 30. The skirt assembly 36 comprises a bracket 38 and a plurality of bristles 40 that extend away from the bracket 36 and the shield 18. In some aspects the bracket 38 has a generally U-shaped configuration that is adapted to engage the first side edge 30 as well as a portion of the front surface 22, and the rear surface 24 of the shield 18 abutting the first side edge 30 to provide a secure engagement and connection between the bracket 30 and the body 20 of the shield 18.

The mount assembly 14 comprises a hinge 42 that connects to a mount member 44. The hinge 42 comprises a first plate or leaf 46 having a first knuckle or set of knuckles 48 and a second plate or leaf 50 having a second knuckle or set of knuckles 52. A pin 54 is received through the first knuckle 48 and the second knuckle 52 to rotatably connect the first plate 46 and second plate 50. In some aspects, the hinge 42 is configured to be biased or spring loaded towards a closed position as described herein, such as by way of a spring 56 that provides the unique benefit of allowing the shield assembly 12 to break away when encountered by a vehicle or similar object as further described herein.

The first plate 46 of the hinge 42 is connected to the rear surface 24 of the shield 18, which in some aspects is accomplished by one or more connecting members 58 such as screws or nails that are passed through the first plate 46 and into the body 20. The second plate 46 is connected to the mount member 44, which in some aspects is accomplished by one or more connecting members 58 passed through the second plate 50 and into the mount member 44 the aspects of which are described more fully herein.

In some aspects, a single hinge 42 is used to connect the shield assembly 12 to the mount member 44, but in others multiple hinges 42 are used to connect the shield 12 to one or more mount members 44. In some embodiments of the present invention, the hinge 42 is connected directly to the surface 16 without the presence of a mount member 44. As seen in the exemplary arrangements shown in the Figures, two hinges 42 are used as such a configuration allows for a small hinge to be used while still being capable of holding the shield assembly 18 in a fixed position against the force of wind. For instance, two hinges 42 having the capacity to move and retain a shield assembly 12 weighing up to 85 pounds is possible. A single hinge 42 having a similar configuration, in comparison, can move and retain a shield assembly 12 weighing up to 50 pounds and a set of three hinges 42 can move and retain a shield assembly 12 weighing up to 110 pounds.

In one aspect, the first plate 46 is positioned such that when the hinge 42 is in a closed position the first knuckle 48 and the second knuckle 52 of the hinge 42 aligns with or substantially aligns with the first side edge 30 of the shield 18. In substantial alignment, no portion of the hinge 42 extends beyond the plurality of bristles 40 of the skirt assembly 36. In this configuration, the hinge 42 has the fullest range of motion from the closed position as the first side edge 30 of the shield 18 does not and cannot physically engage the mount member 44 or the surface 16 when mounted to the surface thereby allowing the hinge 42 to rotate fully to through an open position during break away that is only limited by engagement of a portion of the shield 12, such as the second side edge 32 physically engaging the surface 16. In other aspects, the mount assembly 14 is configured to permit the first plate 46 and the second plate 50 to transition to an open position whereby the first plate 46 and the second plate 50 rotate away that encompasses the range from the closed position until the first plate 46 and second plate 50 are positioned side by side within the same plane or further.

The mount assembly 14 is configured to maintain the shield assembly 12 at a desired angle of deflection, meaning non-parallel, with respect to the surface 16 when the hinge 42 is in a closed position statically or substantially statically. In some aspects, the desired angle of deflection is 45 degrees for optimal lift and deflection as described herein. Alternatively, the desired angle of deflection is 30 to 60 degrees as substantial deflection is still possible. At smaller angles, the wind deflector 10 has insufficient lift and wind is not adequately deflected. At larger angles, the wind deflector 10 is too obtrusive and risks breakage.

In some aspects of the present invention, the hinge 42 has one or more stops 60 that extend from either the first plate 46, the second plate 50, or both that prevent the hinge 42 from closing beyond the desired angle of deflection, e.g., 45 degrees. The stop 60 in some arrangements has a body 62 that extends between a connecting terminal end or edge 64 that fixedly connects the stop 60 to the hinge 42 and a stopping terminal end or edge 66 that is configured to releasably engage the hinge 42 to prevent the hinge 42 from closing beyond the closed position. In such a configuration with a stop 60 extending up from the connecting edge 64 on the first plate 46, the stopping edge 66 would engage the second plate 50 of the hinge 42 in a closed position.

As seen in the exemplary embodiments of the Figures, two stops 60 are present. Each stop 60 is positioned in a generally central location of the first plate 46 such that the stops 60 are positioned between the first knuckles 48 and where the connecting members 58 pass through the first plate 46. In such a configuration, the stops 60 are less prone to breakage and the weight and force of the shield assembly 12 is distributed evenly. In particular aspects, the stops 60 extend 1.25 inches to permit two stops 60 to be used without being prone to breakage by having an overly elongated body 62.

In some embodiments, the stopping edge 66 is slanted at an angle downwardly from a distal terminal end or edge 68 to a proximal terminal end or edge 70 of the stop 60 with respect to the pin 54 that matches the desired angle of deflection. In this configuration, the body 18 of the shield 16 is held in desired angle of deflection statically or fixedly due to the bias of the hinge 42 and the angle of the one or more stops 60. However, if encountered by a vehicle or other object, the force of the encounter will cause the wind deflector 10 to break away, which means the hinge 42 rotates open to an open position against the bias of the hinge 42 moving the shield assembly 12 and thereby limiting or substantially limiting any damage done to the vehicle or object. Once the vehicle or object ceases engagement, the bias of the hinge 42 transitions the hinge 42 back to the closed position to continue wind deflection.

The mount member 44 comprises a first or front surface 72 and a second or rear surface 74 that extend between a top terminal end or edge 76, a bottom terminal end or edge 78, a first side terminal end or edge 80, and a second side terminal end or edge 82. In one aspect of the disclosure, as broadly described herein, the mounting assembly 14 is configured to maintain the shield assembly 12 at a desired angle of deflection in relation to the rear surface 74 of the mount member 44 as described herein when the mounting assembly 14 is in a closed position caused by the bias of the hinge 42.

In particular aspects, the member 20 extends 6 inches by 4 inches and has a depth of 1 inch. In such a configuration, the second plate 50 of the hinge 42 is connected to and engages the front surface 72 of the mount member 44 with connecting member 58 thereby providing a 1 inch gap between the first side edge 30 and the surface 16 thereby permitting the hinge 42 to open beyond a position whereby the first plate 46 and the second plate 50 are positioned side-by-side in the same plane that in turn permits a further break away distance. The presence of the skirt assembly 36 occupies this gap to prevent or inhibit the passage of wind. Alternative configurations are contemplated that utilize different dimensions but accomplish the same or substantially the same advantages.

In some embodiments, the mount member 44 is made of rubber and in some instances a hard rubber such as that used in dapping blocks as the hardness of the rubber provides for a strong and secure connection between the mount member 44 and the surface 16 as well as the mount member 44 and the hinge 42. The use of rubber also prevents or limits harm to the surface 16 caused by small movements of the wind deflector 10, which is particularly true when the surface 16 is brick.

In other aspects, the front surface 72 of the mount member 44 is slanted at an angle of the desired angle of deflection. In such configurations, the hinge 42 does not have stops 60. In yet other aspects, the second plate 50 of the hinge 42 and the mount member 44 are monolithically formed in a single body so as to limit the number of parts, but would require most costly repair and replacement. In still other aspects where the hinge 42 is directly connected to the surface 16, the mount member 44 can be positioned in an alternative position remote and away from the hinge 42 to function similar to the stop 60. While beneficial to some extent, the wear on such configuration as well as the building would be detrimental.

In operation, the wind deflector 10 is attached to the surface 16, such as by passing one or more connecting members 58, such as concrete screws, through the mount member 44 and into the surface 16. For instance, the surface 16 can be a building having a drive-thru window 34 and the wind deflector 10 would be positioned on the far side of the drive-thru window 34 with respect to an approaching patron in a vehicle. The arrangement and configuration of the wind deflector 10 would be such that the wind deflector 10 would be positioned with the first side edge 30 positioned distally from the drive-thru window 34 and upwind and the second edge 32 positioned proximally to the drive-thru window 34 and down wind. The shield 14, in this arrangement, extends upwardly and away from the surface 16 in relation to the extension of the shield 14 between the first side edge 30 and the second side edge 32. In this way, the wind deflector 10 is positioned to substantially fill the space between the drive-thru window 34 and the vehicle as the vehicle stops to complete the transition. As wind approaches, the angle at which the shield assembly 12 is maintained in the closed position provides lift to wind approaching the drive-thru window 34 so that the wind is diverted away from the space blocked by the wind deflector 10. In some arrangements, this configuration is repeated on both sides of the drive-thru window 34 to block wind from either direction.

When the transaction is complete, the wind deflector 10, as described herein, provides for wind deflection with minimal obstruction to the patron who need only turn their vehicle slightly away (or not at all) from the surface 16 in order to avoid the wind deflector 10 after the order is complete. In the event that a front of vehicle, or a side mirror, or any part of the vehicle comes into contact with the wind deflector 10, the vehicle will engage the second side edge 32 and the force of the vehicle will transition the wind deflector 10 to the open position and will continue to transition until the shield assembly 12 is substantially parallel with the surface to allow the vehicle to pass without damaging the vehicle. Once the engagement with the vehicle, the biased nature of the hinge 42 will cause the shield assembly 12 to return to a closed position that provides an arrangement of the shield assembly 12 extending at an angle as described herein with respect to the surface 16 and the mount member 44 when present, including by way of resting upon one or more stops 60 connected to the hinge 42. The mount member 44 limits or prevents wear on the surface and the shield assembly 12 as force is applied to the shield assembly 12 by wind and engagement with vehicles as well as positioning the shield assembly 12 away from the surface 16 thereby providing room for rotation of the hinge 42 within the shield 18 engaging the surface 16. The presence of the skirt assembly 36 blocks or substantially blocks wind from passing through any gap formed between the surface 16 and shield 18 due to the mount of the shield assembly 12 on the mount assembly 14.

Therefore, a wind deflector 10 has been provided that increases patron satisfaction and retention, increases employee satisfaction and retention, does not require energy or power to operate, is easy to assemble and install, is unobtrusive, limits or prevents damage to a vehicle if engaged or struck, is cost effective, increases return on investment, maintains food temperatures, sustains or improves taste scores, is safe to operate, and improves upon the art.

From the above discussion and accompanying figures and claims it will be appreciated that the wind deflector 10 offers many advantages over the prior art. Although the present disclosure and its advantages have been described in detail, it should be understood that various changes, substitutions, modifications, and alterations can be made herein without departing from the technology of the disclosure as defined by the appended claims. The scope of the present application is not intended to be limited to the particular configurations of the process, machine, manufacture, composition of matter, means, methods and steps described in the specification only expressly stated otherwise. As one of ordinary skill in the art will readily appreciate from the disclosure, processes, machines, manufacture, compositions of matter, means, methods, or steps, presently existing or later to be developed that perform substantially the same function or achieve substantially the same result as the corresponding configurations described herein may be utilized according to the present disclosure. Accordingly, the appended claims are intended to include within their scope such processes, machines, manufacture, compositions of matter, means, methods, or steps.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein

What is claimed is:

1. A wind deflector comprising:

a shield assembly connected to a mount assembly;

the mount assembly having a hinge with a first plate and a second plate that are biased towards a closed position;

the first plate connected to a shield of the shield assembly opposite a direction of a bias of the hinge;

the second plate connected to a surface opposite the direction of a bias of the hinge; and a stop connected to the hinge between the first plate, the second plate, the shield, and the surface;

wherein the stop is configured to prevent the hinge from closing beyond a desired angle of deflection in relation to the surface to maintain the shield substantially statically at the desired angle of deflection such that a lift is provided to wind encountered by the shield assembly.

2. The wind deflector of claim 1 wherein the mount assembly is configured to break away when physical force is applied to the shield assembly against the bias of the mount assembly.

3. The wind deflector of claim 1 further comprising the shield assembly having a shield with a front surface, a rear surface, a top edge, a bottom edge, a first side edge, a second side edge, and a skirt assembly having a plurality of bristles connected along the first side edge of the shield.

4. The wind deflector of claim 1 wherein the mount assembly is configured to rotate through an open position during break away that is only limited by engagement of a portion of the shield physically engaging the surface.

5. The wind deflector of claim 1 wherein the first plate is positioned in substantial alignment with a first side edge of the shield such that when the mount assembly is in the closed position no portion of the hinge extends beyond the shield assembly.

6. The wind deflector of claim 1 further comprising the stop having a body that extends from a connecting edge to a stopping edge that is slanted an angle that is substantially identical as the desired angle of deflection.

7. The wind deflector of claim 1 further comprising the second plate connected to a mount member.

8. The wind deflector of claim 7 wherein the mount member is made of rubber.

9. The wind deflector of claim 7 wherein the mount member is configured to form a gap between the surface and the shield.

10. A wind deflector comprising:

a shield assembly connected to a mount assembly;

a skirt assembly connected to the mount assembly;

the mount assembly having a hinge with a first plate and a second plate that are biased toward a closed position;

a shield of the shield assembly connected to the first plate;

a mount member of the mount assembly connected to the second plate;

a stop that extends from the first plate to the second plate on opposing sides of the hinge in relation to the shield and the mount member, wherein the stop is configured to prevent the hinge from closing beyond a desired angle of deflection;

wherein the shield assembly is configured to maintain the shield assembly substantially statically at a desired angle of deflection in relation to a surface when the mount assembly is in a closed position and to break away when physical force is applied to the shield assembly against a mechanical bias of the mount assembly.

11. The wind deflector of claim 10 wherein the mount assembly is configured to rotate through an open position during break away that is only limited by engagement of a portion of a shield of the shield assembly physically engaging the surface.

12. The wind deflector of claim 10 wherein the first plate is positioned in substantial alignment with a first side edge of the shield such that when the mounting assembly is in the closed position no portion of the hinge extends beyond the shield assembly.

13. The wind deflector of claim 10 further comprising the stop having a body that extends from a connecting edge to a stopping edge that is slanted an angle that is substantially identical to the desired angle of deflection.

14. The wind deflector of claim 7 wherein the mount member is configured to form a gap between the surface and the shield.

15. A wind deflector comprising:

a hinge having a first plate and a second plate;

the first plate connected to a rear surface of a shield and the second plate connected to a front surface of a mount member;

the hinge having a spring biased towards a closed position, wherein the first plate and the second plate rotate towards each other and are positioned between the shield and the mount member; and a stop connected to the hinge between the first plate and the second plate, wherein the stop prevents rotation towards the closed position beyond a desired angle of deflection of the shield in relation to a surface.

16. The wind deflector of claim 15 further comprising the stop having a body that extends between a connecting edge that connects to the hinge and a stopping edge that releasably engages the hinge to prevent the hinge from closing beyond the desired angle of deflection.

17. The wind deflector of claim 16 wherein the stopping edge is slanted at an angle that is identical to the desired angle of deflection.

18. The wind deflector of claim 16 wherein the first plate and the second plate of the hinge are connected by a pin, and the stopping edge is slanted at an angle downwardly from a distal edge of the stop towards a proximal edge of the stop in relation to the pin.

19. The wind deflector of claim 15 further comprising a plurality of bristles connected to a bracket connected to a first side edge of the shield, wherein the plurality of bristles extend away from the first side edge and a second side edge of the shield.

20. The wind deflector of claim 15 wherein the desired angle of deflection is between 30 degrees and 60 degrees formed by the first plate and the second plate.

* * * * *